United States Patent [19]

Schmidt

[11] Patent Number: 4,524,323
[45] Date of Patent: Jun. 18, 1985

[54] CERAMIC COATED DIFFERENTIAL SENSOR COIL FOR USE ON A GUN MUZZLE VELOCIMETER

[75] Inventor: Jimmy Q. Schmidt, Baltimore, Md.

[73] Assignee: The United States of America as represented by the Secretary of the Army, Washington, D.C.

[21] Appl. No.: 505,560

[22] Filed: Jun. 17, 1983

[51] Int. Cl.³ .............................................. G01P 3/66
[52] U.S. Cl. .................................. 324/179; 336/177; 336/232
[58] Field of Search ................... 374/179, 178; 73/167; 336/232, 225, 177

[56] References Cited

U.S. PATENT DOCUMENTS

| | | | |
|---|---|---|---|
| 3,419,834 | 12/1968 | McKechnie et al. | 336/232 X |
| 4,228,397 | 10/1980 | Schmidt | 324/179 |
| 4,483,190 | 11/1984 | Cornett | 324/179 X |
| 4,486,710 | 12/1984 | Schmidt | 324/179 |

Primary Examiner—Stanley T. Krawczewicz
Attorney, Agent, or Firm—Anthony T. Lane; Robert P. Gibson; Harold H. Card, Jr.

[57] ABSTRACT

A differential sensor coil assembly is described which is suitable for placement at the muzzle end of a gun to measure projectile velocity, and which is more capable of resisting propellant gas and muzzle blast wear and erosion effects on the inner coil. A solid sheet coil assembly having a common inner-outer end configuration for inner and outer coil loop include a first plasma arc metal coating, a second ceramic plasma or coating and an expoxy filler means for filling the open areas between the inner and outer loop.

5 Claims, 2 Drawing Figures

CERAMIC COATED DIFFERENTIAL SENSOR COIL FOR USE ON A GUN MUZZLE VELOCIMETER

GOVERNMENTAL INTEREST

The invention described herein may be manufactured, used and licensed by or for the Government for governmental purposes without the payment to me of any royalty thereon.

FIELD OF THE INVENTION

This invention is related to solid metal ceramic coated differential coils designed to be positioned at the muzzle of a gun and to provide longer operating life when used with a radio frequency electronic velocimeter.

BACKGROUND OF THE INVENTION

Electronic velocimeter with radio frequency coupled coils have been used in the past to measure projectile muzzle velocity, particularly on rapid fire or moving gun systems. The differential coil configuration, as opposed to the single coil design, has been proven to reduce the effect of other gun projectile related parameters and to improve the accuracy of the velocity measurement. The problem with the aforementioned devices, including the device described in U.S. Pat. No. 4228397, has been the rapid deterioration of the coil sensors accuracy due to the severe environment at the muzzle end of the gun. Propellant gases cause the inner loop of the sensor to erode with use. The rate of erosion varies, depending on the type gun and the propellants used. Erosion of the inner loop of the differential sensor causes an imbalance in the differential configuration which induces errors in measurement. In addition when the erosion continues for a sufficient period of time high pressure propellant gases leak between the sensor assembly and the muzzle face and can cause the sensor to be blown off of the gun.

Prior art methods used to measure projectile velocity sometime measure the time taken for a projectile to traverse a known distance between two sensing devices. From this time measurement and known distance, the velocity can be computed. This velocity, however is the average velocity at the midpoint of the reference distance and not the velocity at the muzzle. The aforementioned methods utilize velocity coils, light screens, break wires and strain patches.

Other prior art devices make use of a known time interval and measure the distance the projectile travels in that time. An example of this is the use of high speed photography which uses either visible light or X-rays. The problem with this method is that the velocity is measured at the instrument and not at the muzzle.

Micro-wave interferometery is also used to measure projectile velocity in-bore as well as down range. However, even though this method can provide direct muzzle velocity measurement, the measurement is frequently unreliable because of severe loss of signal due to ionized gases in the muzzle region.

The problem with prior art electronic velocimeters using radio frequency coupled inductive sensor coils, was that even though this method provided a real time measurement of projectile velocity directly at the muzzle, by utilizing only a single sensor at the muzzle and measuring the time interval of the projectile length to pass the sensor, the sensor was rapidly destroyed because of the exposure to the extremely harsh environment.

PRIOR ART STATEMENT

U.S. Pat. No. 4,228,397 and pending U.S. patent application Ser. No. 415,956 filed 8 Sept. 1982 both disclose single sensor coils mounted at the muzzle of a gun. The latter describes the principal operation of a radio frequency coupled differential sensor coils for improved muzzle velocity measurements. The present invention can be distinguished from these sensor coils in that the ceramic coating substantially reduces the rate of erosion on the inner loop thus eliminating the gradual degradation in the accuracy of the measurement. In addition the reduced rate of erosion reduces the danger of high pressure gas leaks blowing the sensor assembly off the gun after repeated use.

SUMMARY OF THE INVENTION

Solid metal, ceramic coated differential sensor coils have been designed to resist inner coil erosion when the coil is positioned at the muzzle end of a gun.

An object of the present invention is to provide solid metal, ceramic coated coils which are capable of substantially reducing the rate of erosion of the inner loop when the coil assembly is attached to the muzzle face of a gun.

Another object of the present invention is to provide a solid metal ceramic coated differential sensor coil which when used with a radio frequency electronic velocimeter has after repeated use reduced danger of high pressure gas leaks blowing the sensor assembly off of the gun.

A further object of the present invention is to provide a solid metal ceramic coated differential sensor coil suitable for use with an electronic velocimeter, which, when attached to the muzzle face of a gun, has a reduced rate of inner loop erosion, thus reducing the rate at which the sensor becomes unbalanced and eliminates the gradual degradation in accuracy of the velocimeter measurement.

For a better understanding of the present invention, together with other and further objects thereof, reference is made to the following descriptions taken in connection with the accompanying drawings.

BRIEF DESCRIPTION OF THE DRAWING

Throughout the following description like reference numerals are used to denote like parts of the drawings.

DESCRIPTION OF THE PREFERRED EMBODIMENTS

Figure 1:
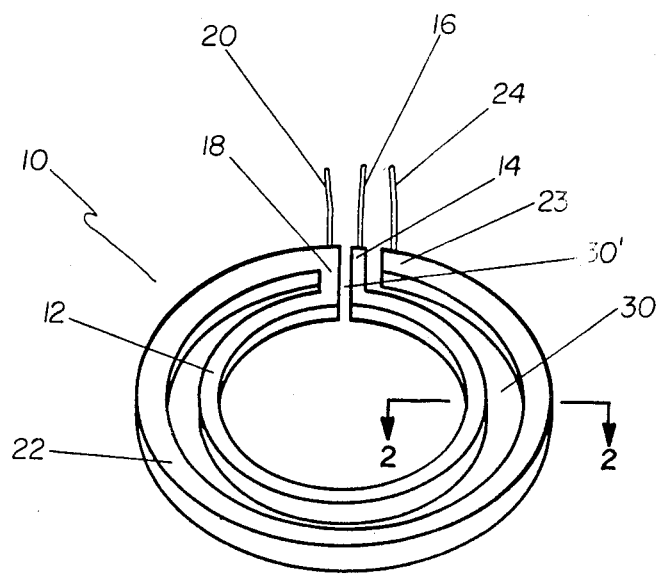
FIG. 1 is an isometric view of the coated sensor coil.

Referring now to FIG. 1 the sensor coil assembly 10 is fabricated from a single sheet of metal, such as steel. In the preferred embodiment the coil thickness is approximately 0.1 inches thick. An inner loop 12 has on one free end 14 a first wire connector 16 soldered thereto. The other inner-outer loop common end 18 has a second wire connector 20 soldered thereto. The outer concentrically disposed loop 22 has a second free end 23 which has a third wire connector 24 soldered thereto. As described in the aforementioned pending U.S. patent application Ser. No. 415,956, Now U.S. Pat. No. 4,486,710, the differential coils 12 and 22, after being coated are electrically coupled to oscillator circuitry, not shown, through wire connectors 16, 20 and 24.

Figure 2:
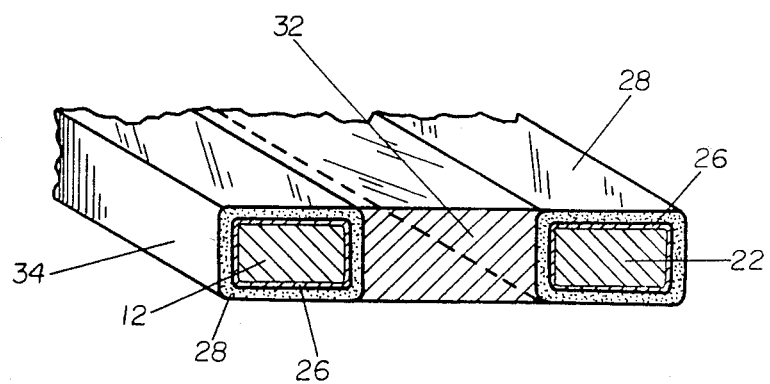
FIG. 2 is an enlarged cross-sectional view of FIG. 1 taken along line 2—2.

Referring now to FIGS. 1 and 2, the coils 12 and 22 are given a Nickel Aluminum undercoating 26 by means of a plasma arc spraying device such as manufactured by METCO of Westbury, L.I., N.Y. The complete metal sensor coil is then coated by plasma arc process with a layer of Aluminum Oxide 28, such as METCO 105NS material, approximately 0.020 inches thick. After the assembly is coated with the ceramic, the open areas 30, 30' between the inner and outer coils 12 and 22 are filled in with an epoxy 32.

In operation, the sensor assembly is epoxied in a metal mounting collar, not shown, and attached to the muzzle of a gun being tested for projectile velocity. When mounted on the gun, the only area exposed to the propellant gases and blast effects is the inner edge 34 of the inner loop 12 and a small area of nonconductive epoxy filler 32 located in open area 30'. In the preferred embodiment the area 30' is filled with ceramic coating as much as possible in order to provide a complete ceramic face on the inner edge 34 of the sensor coil assembly. Nonconductive epoxy material, well known in the art, is used to fill any void not filled by the ceramic. If during the course of testing the ceramic coating 28 on the inner edge 34 erodes away, the solid metal face of the inner loop 12, since it is made of steel, will provide more erosion resistance than prior art differential coil sensors which use printed circuit structural materials such as copper.

The foregoing disclosure and drawings are merely illustrative of the principles of this invention and are not to be interpreted in a limiting sense. I wish it to be understood that I do not desire to be limited to the exact details of construction shown and described for obvious modifications will occur to a person skilled in the art.

What is claimed is:

1. A ceramic coated differential sensor for use on a gun muzzle velocimeter which comprises:
   an inner loop having a first free end and a common inner-outer end;
   a concentrically disposed outer loop, operatively spaced from said inner loop, having a second free end and another end integrally connected with said common inner-outer end;
   wire connector means fixedly attached to said first and second free ends and to said common inner-outer end;
   first plasma arc coating means for providing an undercoating surface to said inner and outer loops;
   second plasma arc coating means operatively disposed over said first plasma arc coating means for providing a wear and erosion resistance surface to said sensor; and
   epoxy filler means for filling the open area intermediate said inner loop and said outer loop.

2. A ceramic coated sensor as recited in claim 1 wherein said inner and outer loops comprise an assembly fabricated from a single sheet of steel.

3. A ceramic coated sensor as recited in claim 2 wherein said first plasma arc coating means includes a nickel aluminum undercoating.

4. A ceramic coated sensor as recited in claim 3 wherein said second plasma arc coating includes a layer of aluminum oxide approximately 0.020 inches thick.

5. A ceramic coated sensor as recited in claim 4 wherein said epoxy filler means includes a nonconductive epoxy filler material.

* * * * *